(12) United States Patent
Jang et al.

(10) Patent No.: US 9,616,760 B2
(45) Date of Patent: Apr. 11, 2017

(54) INVERTER-CHARGER INTEGRATED DEVICE FOR ELECTRIC VEHICLE

(71) Applicant: LSIS CO., LTD., Anyang-si, Gyeonggi-do (KR)

(72) Inventors: Jae Hoon Jang, Seoul (KR); Byung Woon Jang, Seoul (KR); Joong Ki Jung, Seoul (KR); Chun Suk Yang, Seongnam-si, Gyeonggi-do (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/478,872

(22) Filed: Sep. 5, 2014

(65) Prior Publication Data
US 2015/0069936 A1    Mar. 12, 2015

(30) Foreign Application Priority Data
Sep. 9, 2013    (KR) .......................... 10-2013-0108130

(51) Int. Cl.
*B60L 3/04*    (2006.01)
*H02M 7/04*    (2006.01)
(Continued)

(52) U.S. Cl.
CPC ....... *B60L 11/1814* (2013.01); *B60L 11/1803* (2013.01); *B60L 11/1816* (2013.01);
(Continued)

(58) Field of Classification Search
CPC ........ H02M 5/40; H02M 3/156; H02M 3/157; B60L 15/20
See application file for complete search history.

(56) References Cited

U.S. PATENT DOCUMENTS 4,761,726 A  *  8/1988  Brown ........................... 363/51
8,466,652 B2 *  6/2013  Klaes .................. B60L 11/1803
                                                    320/107
(Continued)

FOREIGN PATENT DOCUMENTS

CN    201550026    8/2010
CN    102684283    9/2012
(Continued)

OTHER PUBLICATIONS

Korean Intellectual Property Office Application Serial No. 10-2013-0108130, Office Action dated Jul. 31, 2014, 4 pages.
(Continued)

*Primary Examiner* — Eduardo Colon Santana
*Assistant Examiner* — Charles S Laughlin
(74) *Attorney, Agent, or Firm* — Lee Hong Degerman Kang & Waimey

(57) ABSTRACT

An inverter-charger integrated device for an electric vehicle is provided. The inverter-charger integrated device for the electric vehicle includes a motor; a power input unit; a rectifying unit; an inverter; and a control unit, wherein the inverter comprises a first group of switches including first and second switches, a second group of switches including third and fourth switches, and a third group of switches including fifth and sixth switches, the rectifying unit is directly connected to the first of the first to third groups of switches, and phases of the motor are respectively connected to the first to third group of switches.

4 Claims, 5 Drawing Sheets

(51) Int. Cl.
*B60L 11/18* (2006.01)
*B60L 15/00* (2006.01)
(52) U.S. Cl.
CPC ....... *B60L 11/1861* (2013.01); *B60L 11/1864* (2013.01); *B60L 11/1887* (2013.01); *B60L 15/007* (2013.01); *B60L 2210/30* (2013.01); *Y02T 10/645* (2013.01); *Y02T 10/7044* (2013.01); *Y02T 10/7061* (2013.01); *Y02T 10/7072* (2013.01); *Y02T 10/7241* (2013.01); *Y02T 90/127* (2013.01); *Y02T 90/14* (2013.01); *Y02T 90/34* (2013.01)

(56) References Cited

U.S. PATENT DOCUMENTS

| | | | | |
|---|---|---|---|---|
| 8,520,413 | B2* | 8/2013 | Tran | H02M 3/155 323/222 |
| 2008/0211449 | A1* | 9/2008 | Yamai et al. | 318/767 |
| 2011/0181236 | A1* | 7/2011 | Yang | B60L 11/1868 320/107 |
| 2011/0292697 | A1* | 12/2011 | Alexander | 363/37 |
| 2012/0062176 | A1* | 3/2012 | Hasan | B60L 7/14 320/109 |
| 2012/0098346 | A1* | 4/2012 | Garrity et al. | 307/82 |
| 2012/0235605 | A1* | 9/2012 | Jang | B60L 11/1803 318/139 |
| 2013/0181625 | A1* | 7/2013 | Pan et al. | 315/200 R |

FOREIGN PATENT DOCUMENTS

| | | |
|---|---|---|
| JP | 2008-17652 | 1/2008 |
| JP | 2013-099145 | 5/2013 |
| KR | 10-1004498 | 12/2010 |
| KR | 10-2012-0010631 | 2/2012 |

OTHER PUBLICATIONS

The State Intellectual Property Office of the People's Republic of China Application Serial No. 201410455794.0, Office Action dated Feb. 24, 2016, 7 pages.

\* cited by examiner

INVERTER-CHARGER INTEGRATED DEVICE FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2013-0108130, filed Sep. 9, 2013, the contents of which are all hereby incorporated by reference herein in its entirety.

BACKGROUND

The present disclosure relates to an inverter-charger integrated device in which a charger supplying charging power to a battery in an electric vehicle is integrated into an inverter for driving a motor.

In general, the electric vehicle includes a high-voltage battery in which a high voltage of e.g., about 72 V is charged, a three-phase motor that is driven with power charged in the high-voltage battery and enables the electric vehicle to run, and an inverter for driving the three-phase motor. Driving the three-phase motor with the power charged in the high-voltage battery involves a limitation according to the capacity of the high-voltage battery.

When power remaining in the high-voltage battery of the electric vehicle is less than or equal to a certain level, it is not possible to drive the three-phase motor. Therefore, the electric vehicle may include a high-voltage charger to charge power in the high-voltage battery. Such a high-voltage charger may be roughly classified into a low-speed charger using single-phase alternating current (AC) power for home and a high-speed charger using three-phase AC power.

However, as described in Korean Patent Application No. KR 20-2002-0007560, each of the inverter, the high-voltage charger and a low-voltage charger is mutually separated.

As described above, since each of the inverter, the high-voltage charger and the low-voltage charger is installed in the electric vehicle in a state where they are mutually separated, there is a limitation in that a lot of time and labor force are needed for designing them.

SUMMARY

Embodiments provide an inverter-charger integrated device for an electric vehicle that may perform an inverter function and a charger function.

Also, embodiments also provide an inverter-charger integrated device for an electric vehicle that may be applied to both a Y-connected three-phase induction motor and a delta type induction motor.

Technical tasks to be achieved by proposed embodiments are not limited to the above-mentioned technical tasks and other technical tasks not mentioned will be able to be clearly understood by a person skilled in the art from the following descriptions.

In one embodiment, an inverter-charger integrated device for an electric vehicle includes a motor; a power input unit to which alternating current (AC) power is applied; a rectifying unit rectifying applied AC power and outputting rectified power; an inverter arranged between the rectifying unit and the battery, wherein the inverter supplies charging power for the charging of the battery by using power rectified through the rectifying unit in an first operating condition and supplies driving power for the driving of the motor by using power charged in the battery in a second operation condition; and a control unit determining the operating condition of the inverter and operating the inverter according to a determined operating condition, wherein the inverter comprises a first group of switches including first and second switches, a second group of switches including third and fourth switches, and a third group of switches including fifth and sixth switches, the rectifying unit is directly connected to the first of the first to third groups of switches, and phases of the motor are respectively connected to the first to third group of switches.

The rectifying unit may include: a rectifier including a plurality of diodes, and a power factor corrector including a transistor and an inductor, wherein the power factor corrector may correct the power factor of power rectified through the rectifier.

One end of the inductor may be connected to an emitter of the transistor, and the other end of the inductor may be connected to a point where the first switch and the second switch of the first group of switches are connected.

The inverter may be configured to: operate only the first group of switches connected to the rectifying unit in the first operation condition, and operate all the first to third groups of switches in the second operation condition.

The control unit may turn ON the transistor and the second switch for a first period and turn OFF the transistor and the second switch for a second period, in the first operation condition, and the first switch may maintain a turn-OFF state in the first operating condition and operate as a diode.

The motor may include any one of a Y-connected motor and a delta-connected motor.

According to an embodiment, since an inverter and a charger are integrated to be one device, it is possible to remarkably decrease wastes of labor force and time for designing the electric vehicle.

Also, according to another embodiment, it is possible to provide an inverter-charger integrated device that is applied to a delta-connected induction motor in addition to a Y-connected induction motor.

The details of one or more embodiments are set forth in the accompanying drawings and the description below. Other features will be apparent from the description and drawings, and from the claims.

The details of one or more embodiments are set forth in the accompanying drawings and the description below. Other features will be apparent from the description and drawings, and from the claims.

DETAILED DESCRIPTION OF THE EMBODIMENTS

The followings only illustrate the principle of the present invention. Therefore, a person skilled in the art may invent various devices that implement the principle of the present invention and are included in the concepts and scope of the present invention, although being not clearly shown or described in the specification. Also, all conditional terms and embodiments enumerated in the specification are, in principle, intended only for the purpose of understanding the concept of the present invention and thus it should be understood that the present invention is not limited to embodiments and state to be particularly enumerated.

Also, it should be understood that all detailed descriptions enumerating specific embodiments as well as the principle, view and embodiments of the present invention are intended to include their structural and functional equivalents. Also, such equivalents should be understood as including currently known equivalents as well as equivalents to be developed in future, namely, all elements invented to perform the same function irrespective of their structures.

In the following claims, components expressed as means for performing functions described in the detailed description are intended as including, for example, combinations of circuit elements performing the functions or all methods performing functions including all types of software including firmware/micro codes, and are combined with appropriate circuits for executing the software to perform the functions. Since the present invention defined by such claims follows a rule needed by claims and functions provided by various enumerated means are combined, it should be understood that any means capable of providing the functions are equivalent to matters grasped from the specification.

The above objects, characteristics, and advantages will be clear through the following detailed description related to the accompanying drawings and thus a person skilled in the art will be able to easily practice the technological spirit of the present invention. Also, in describing the present invention, detailed descriptions of known techniques related to the present invention will be ruled out in order not to unnecessarily obscure subject matters of the present invention.

In the following description, since the suffixes "module" and "unit" for components are only given for easiness in making the present disclosure, they may be interchanged.

Exemplary embodiments of the present invention are described below in detail with reference to the accompanying drawings.

Figure 1:
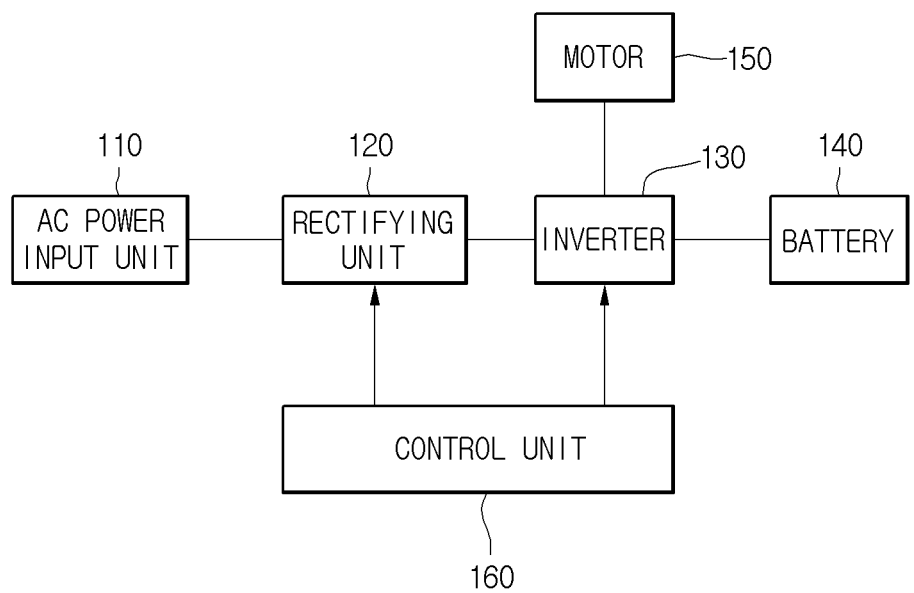
FIG. 1 is a block diagram of an inverter-charger integrated device for an electric vehicle according to an embodiment.

FIG. 1 is a block diagram of an inverter-charger integrated device for an electric vehicle according to an embodiment.

Referring to FIG. 1, an inverter-charger integrated device for an electric vehicle includes an alternating current (AC) power input unit 110, a rectifying unit 120, an inverter 130, a battery 140, a motor 150, and a control unit 160.

The AC power input unit 110 receives commercial AC power externally supplied.

The commercial AC power may be single-phase AC power and may be e.g., 220 V single-phase AC power for home.

The rectifying unit 120 rectifies and outputs the commercial AC power input through the AC power input unit 110.

That is, the rectifying unit 120 includes a plurality of diodes, rectifies the commercial AC voltage and outputs a rectified voltage.

Also, the rectifying unit 120 corrects the power factor of the rectified power and outputs a resulting voltage.

The inverter 130 is arranged between the rectifying unit 120 and the high-voltage battery 140.

The inverter 130 uses power output through the rectifying unit 120 to supply charging power for the charging of the high-voltage battery 140 in a first operating condition.

On the other hand, the inverter 130 switches charging power charged in the high-voltage battery 140 to supply a voltage for driving the motor 150 in a second operating condition.

The inverter 130 includes first to sixth switching devices S1 to S6 and performs power converting operations suitable for the first and second operating conditions according to the switching operations of the first to sixth switching devices.

The high-voltage batter may be a fuel cell, generate direct current (DC) power by generating electrical energy through the chemical reaction between hydrogen H2 and oxygen O2 and accumulating generated electrical energy in a stack, and also be charged by a DC voltage supplied through the terminal of the battery.

The motor 150 is connected to the inverter 130 and thus driven by three-phase AC power supplied through the inverter 130. The motor 150 is used for driving an electric vehicle and receives three-phase AC power supplied through the inverter 130 in an operating mode.

The control unit 160 controls the overall operations of the inverter-charger integrated device for the electric vehicle.

In particular, the control unit 160 determines the operating mode of the inverter 130 and controls the operation of the inverter 130 according to a determined operating mode.

The operating mode of the inverter 130 includes a driving mode for driving the motor and a charging mode for the charging of the high-voltage battery (also including a low-voltage battery).

The operating mode of the inverter 130 may be set to the charging mode when the following conditions are satisfied:

(1) when the charging of the battery is requested through a separate charging switch, (2) AC power is input through the AC power input unit 110, and (3) a message for a charging request is received through a controller area network (CAN) communication module.

That is, when the above conditions are satisfied, the control unit 160 allows the inverter 130 to work as a charger, switches power rectified through the rectifying unit 120 through the inverter 130, and generates a charging voltage for charging the high-voltage battery 140.

Also, the control unit 160 checks the state of a gearshift and determines whether to operate or stop the inverter 130 according to the state of the gearshift identified through the checking For example, when the operating mode of the inverter 130 is set to a charging mode and the gearshift is in a neutral state, the control unit 160 operates the inverter 130 and charges the high-voltage battery 140.

Also, when the operating mode of the inverter 130 is set to a charging mode and the gearshift is in any one of driving, reverse and parking states in stead of a neutral state, the control unit 160 stops the inverter 130 and together outputs a warning message requesting to change the state of the gearshift to a neutral state for the charging of the high-voltage battery 140.

The operating mode of the inverter 130 may be set to the driving mode when the following conditions are satisfied:

(1) when the charging of the battery is not requested through a separate charging switch, (2) AC power is not input through the AC power input unit 110, and (3) a message for a charging request is not received through a controller area network (CAN) communication module.

Also, in the case where the operating mode of the inverter 130 is set to the driving mode, when the state of the gearshift is in any one of driving, reverse and parking states, the control unit 160 drives the inverter 130 to supply driving power to the motor 150, and when the state of the gearshift is in a neutral state, the control unit 160 stops the inverter 130.

The inverter-charger integrated device for the electric vehicle is described below in more detail with reference to the accompanying drawings.

Figure 2:
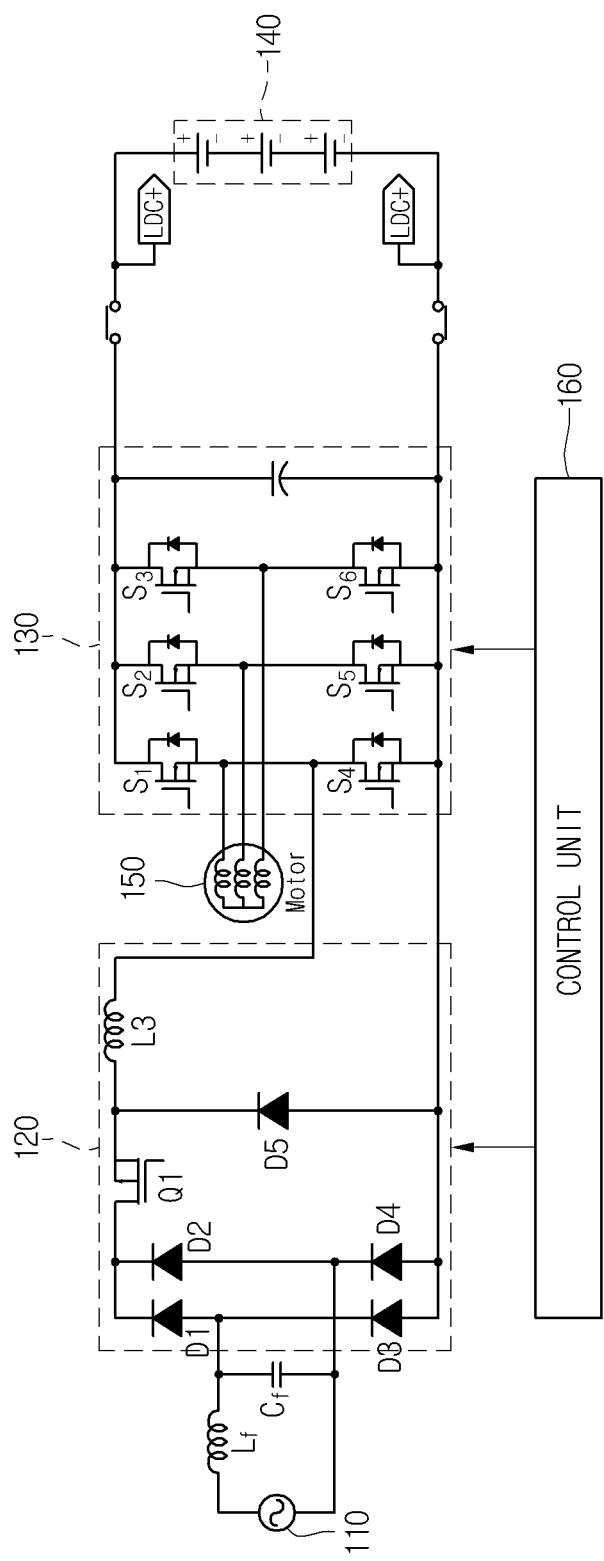
FIG. 2 is a detailed circuit diagram of an inverter-charger integrated device for an electric vehicle of FIG. 1.

FIG. 2 is a detailed circuit diagram of the inverter-charger integrated device for the electric vehicle of FIG. 1.

Referring to FIG. 2, the rectifying unit 120 includes a first diode D1, a second diode D2, a third diode D3, a fourth diode D4, a sixth diode D5, a transistor Q1, and an inductor LB.

In this case, a first inductor Lf and a first capacitor Cf may be arranged between the AC power input unit 110 and the rectifying unit 120.

The first inductor Lf and the first capacitor Cf are filter units and removes an external surge voltage and electromagnetic interference (EMI) from AC power input through the AC power input unit 110.

The rectifying unit 120 rectifies AC power input through the AC power input unit 110 through the first to fourth diodes D1 to D4, and corrects the power factor of a rectified voltage through the fifth diode D5, the transistor Q1, and the inductor LB.

Substantially, the first to fourth diodes D1 to D4 of the rectifying unit 120 are rectifiers, and the transistor, the inductor LB, and the fifth diode D5 are power factor correctors for correcting a power factor.

The switching operation of the transistor Q1 of the rectifying unit 120 is described below in detail.

The inverter 130 includes a first switch S1, a second switch S2, a third switch S3, a fourth switch S4, a fifth switch S5, and a sixth switch S6.

In this case, one end of the first switch S1 is connected to one end of the fourth switch S4 in series, and accordingly, they form a first group of switches.

Also, one end of the second switch S2 is connected to one end of the fifth switch S5 in series, and accordingly, they form a second group of switches. In this case, switches belonging to the second group of switches are connected to switches belonging to the first group of switches in parallel.

Also, one end of the third switch S3 is connected to one end of the sixth switch S6 in series, and accordingly, they form a third group of switches. In this case, switches belonging to the third group of switches are connected to switches belonging to the second group of switches in parallel.

In this case, the positive electrode of the rectifying unit 120 is connected to one of the first to third group of switches. Although FIG. 2 shows that the positive electrode of the rectifying unit 120 is connected to the first group of switches, it is only an example and the positive electrode of the rectifying unit 120 may also be connected to the second or third group of switches.

The positive electrode of the rectifying unit 120 is connected to one of the first switch and to one contact of the fourth switch S4.

Also, the other end of the fourth switch S4 is connected to the negative electrode of the rectifying unit 120.

The other end of the first switch S1, the other end of the second switch S2, and the other end of the third switch S3 are mutually connected.

Also, the other end of the fourth switch S4, the other end of the fifth switch S5, and the other end of the sixth switch S6 are mutually connected.

A point where the first switch S1 is connected to the fourth switch S4, a point where the second switch S2 is connected to the fifth switch S5, and a point where the third switch S3 is connected to the sixth switch S6 are connected to the motor 150.

Also, the inverter 130 receives rectified power in a charging mode based on the first group of switches connected to the rectifying unit 120, and supplies charging power to the high-voltage battery 140 by the switching operations of the first switch S1 and the fourth switch S4 of the first group of switches.

Also, the inverter 130 receives power charged in the high-voltage battery 140 through the first group of switches, the second group of switches, and the third group of switches in the driving mode, and supplies driving power to the motor 150 according to the switching operations of the switches of the first to third group of switches.

The control unit 160 controls the switching operations of the transistor Q1 of the rectifying unit 120 and the first to sixth switches of the inverter 130.

That is, the inverter 130 includes the first to third groups of switches that include the first to sixth switches. Also, the inverter 130 operates only switches of any one of the first to third groups of switches in the charging mode and switches of all the first to third groups of switches in the driving mode.

Figure 3:
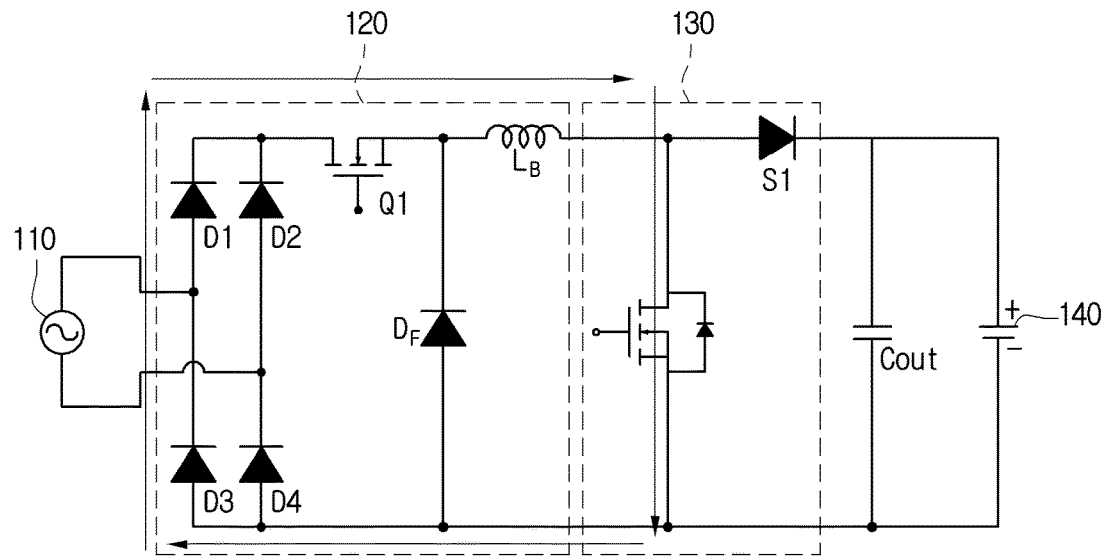
FIGS. 3 and 4 are equivalent circuit diagrams of an inverter-charger integrated device for an electric vehicle according to embodiments.
Figure 4:
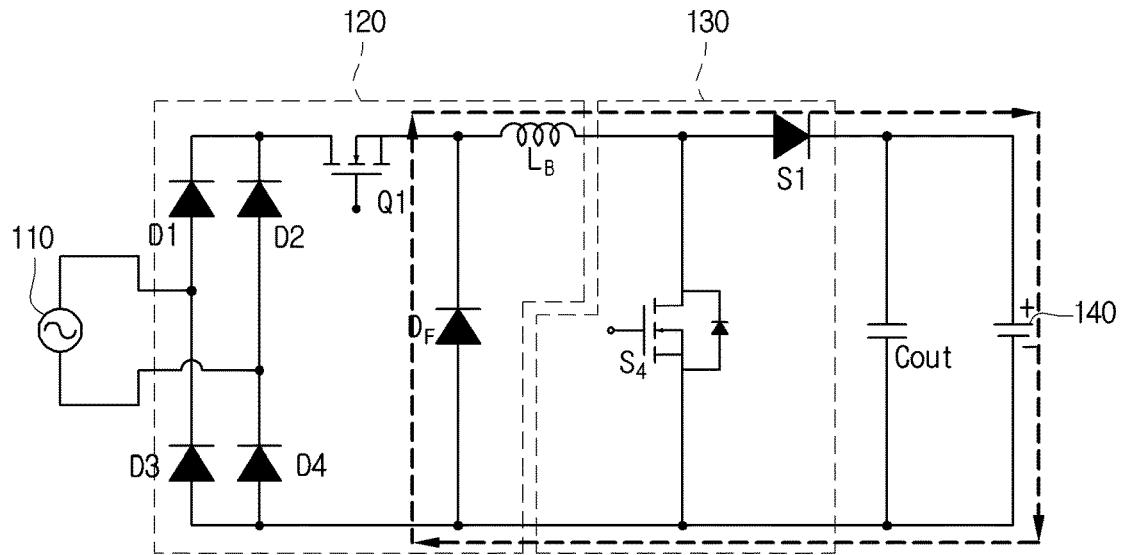

FIGS. 3 and 4 are equivalent circuit diagrams of the inverter-charger integrated device for the electric vehicle according to embodiments.

FIGS. 3 and 4 represent the operation of the inverter 130 in the charging mode.

FIG. 3 represents the operation of the inverter-charger integrated device for the electric vehicle for a first period, and FIG. 4 represents the operation of the inverter-charger integrated device for the electric vehicle for a second period.

Referring to FIGS. 3 and 4, the control unit 160 turns ON the transistor Q1 of the rectifying unit 120 and the fourth switch of the inverter 130 for the first period.

In this case, the first switch S1 of the inverter 130 always maintains an OFF state in the charging mode. That is, the first switch S1 always maintains an OFF state in the charging mode and thus operates as a diode (using an internal body diode).

As described above, when the transistor Q1 and the fourth switch S4 are in an ON state, currents flow in an arrow direction as shown in FIG. 3 and thus power obtained by rectifying commercial AC power is stored in the inductor LB through the transistor Q1 and the fourth switch S4.

The control unit 160 turns OFF the transistor Q1 and the fourth switch S4 for the second period.

If the transistor Q and the fourth switch S4 are turned OFF, power stored in the inductor LB is transmitted to the high-voltage battery 140 through the body diode and freewheeling diode DF of the first switch S1 of the inverter 130.

As described above, by not using the neutral point of a Y-connected motor but directly connecting the rectifying unit 120 to the inverter 130, an embodiment may configure an inverter-charger integrated device for a delta-connected motor in addition to the Y-connected motor.

Figure 5:
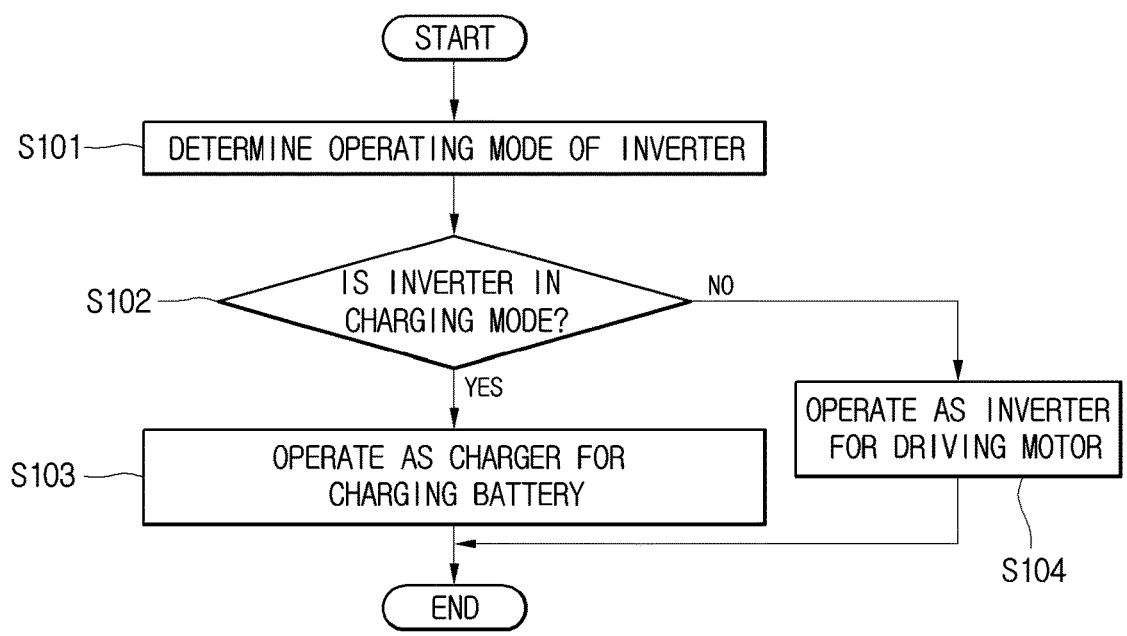
FIGS. 5 and 6 are flow charts for explaining, step by step, methods of operating an inverter-charger integrated device for an electric vehicle according to embodiments.
Figure 6:
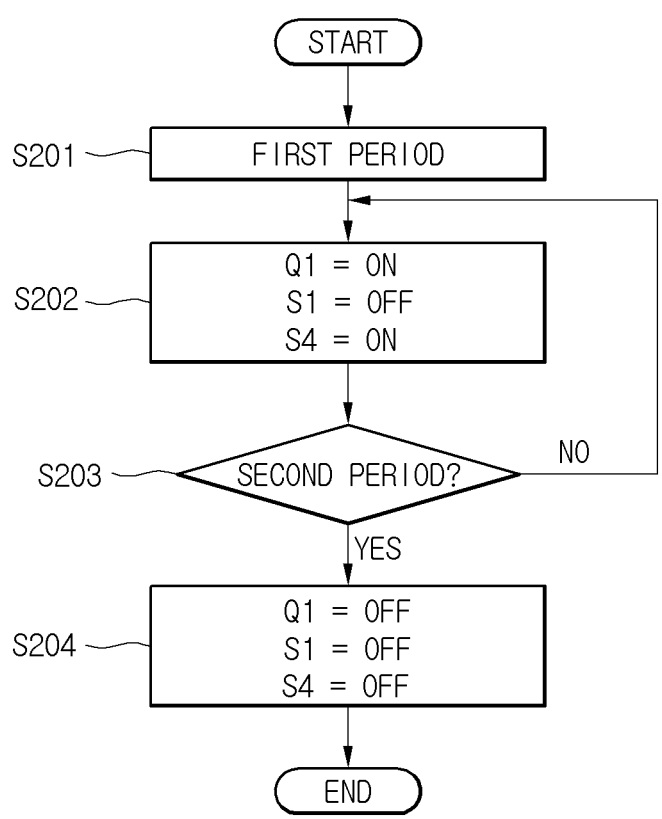

FIGS. 5 and 6 are flow charts for explaining, step by step, methods of operating the inverter-charger integrated device for the electric vehicle according to embodiments.

Referring to FIG. 5, the control unit 160 first determines the operation mode of the inverter 130 in step S101.

That is, the control unit 160 determined based on various conditions whether to use the inverter 130 as a charger for the charging of the high-voltage battery 140 or whether to use the inverter 130 as an inverter for driving the motor 150.

Then, the control unit 160 determines whether the operating mode is determined as the charging mode in step S102.

When the operating mode is determined as the charging mode as a determination result in step S102, the control unit 160 operates the inverter 130 as a charger for charging a battery in step S103.

In this case, only the first switch S1 and the fourth switch S4 that belong to the first group of switches among a plurality of switches (and are connected to the rectifying unit) operate.

Also, when the operating mode is determined as the driving mode as a determination result in step S102, the control unit 160 operates the inverter 130 as an inverter for driving the motor 150 in step S104.

Also, referring to FIG. 6, when a first period in the charging mode arrives in step S201, the control unit 160 turns ON the transistor Q1 and the fourth switch S4 and turns OFF the first switch S1 in step S202.

By the operations of the transistor Q1, the first switch S1, and the fourth switch S4, rectified power is stored in the inductor of the rectifying unit 120.

Also, the control unit 160 determines whether a second period arrives in step S203.

When the second period arrives as a determination result in step S203, the transistor Q1, the first switch S1, and the fourth switch S4 are all turned OFF in step S204.

By the turn-OFF operations of the transistor Q1, the first switch S1, and the fourth switch S4, power stored in the inductor LB is transmitted to the high-voltage battery 140.

According to an embodiment, since an inverter and a charger are integrated to be one device, it is possible to remarkably decrease wastes of labor force and time for designing the electric vehicle.

Also, according to another embodiment, it is possible to provide the inverter-charger integrated device that may be applied to a delta-connected induction motor in addition to a Y-connected induction motor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An inverter-charger integrated device for an electric vehicle comprising:
   a motor;
   a power input unit to which alternating current (AC) power is applied;
   a rectifying unit rectifying applied AC power and outputting rectified power, wherein the rectifying unit comprises a positive electrode and a negative electrode;
   an inverter arranged between a single rectifying unit, which is the rectifying unit, and the battery, wherein the inverter supplies charging power for the charging of the battery by using power rectified through the rectifying unit in an first operating condition and supplies driving power for the driving of the motor by using power charged in the battery in a second operation condition; and
   a control unit determining the operating condition of the inverter and operating the inverter according to a determined operating condition,
   wherein the rectifying unit further comprises a rectifier including a plurality of diodes, and a power factor corrector including a transistor, an inductor, and a diode,
   wherein the power factor corrector corrects the power factor of power rectified through the rectifier,
   wherein the inverter comprises a first group of switches comprising first and second switches, a second group of switches comprising third and fourth switches, and a third group of switches comprising fifth and sixth switches,
   wherein one end of the inductor is connected to an emitter of the transistor and to an end of the diode of the rectifying unit, and wherein the other end of the inductor is connected to the positive electrode of the rectifying unit which is connected between the first switch and the second switch of the first group of switches to provide rectified and power factored corrected power to a first phase of the motor,
   the positive electrode of the rectifying unit is directly connected to the first group of switches and is not directly connected to either the second group of switches or the third group of switches, and wherein the negative electrode of the rectifying unit is directly connected to each of the first group of switches, the second group of switches, and the third group of switches, and
   the first phase, a second phase, and a third phase of the motor are respectively connected to the first to third group of switches and wherein the inductor of the rectifier is not the same as the first, the second, or the third phases of the motor.

2. The inverter-charger integrated device according to claim 1, wherein the inverter is configured to:
   operate only the first group of switches connected to the rectifying unit in the first operation condition, and
   operate all the first to third groups of switches in the second operation condition.

3. The inverter-charger integrated device according to claim 1, wherein the control unit turns ON the transistor and the second switch for a first period and turns OFF the transistor and the second switch for a second period, in the first operation condition, and
   the first switch maintains a turn-OFF state in the first operating condition and operates as a diode.

4. The inverter-charger integrated device according to claim 1, wherein the motor comprises any one of a Y-connected motor and a delta-connected motor.

* * * * *